(12) United States Patent
Li et al.

(10) Patent No.: US 12,686,639 B2
(45) Date of Patent: Jul. 21, 2026

(54) CERAMIC, VAPORIZATION CORE, AND VAPORIZER

(71) Applicant: SHENZHEN SMOORE TECHNOLOGY LIMITED, Shenzhen (CN)

(72) Inventors: Pei Li, Shenzhen (CN); Hongxia Lv, Shenzhen (CN); Zhenlong Jiang, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 473 days.

(21) Appl. No.: 18/191,366

(22) Filed: Mar. 28, 2023

(65) Prior Publication Data

US 2023/0339818 A1      Oct. 26, 2023

(30) Foreign Application Priority Data

Apr. 20, 2022      (CN) .......................... 202210418915.9

(51) Int. Cl.
| | |
|---|---|
| *A24F 40/10* | (2020.01) |
| *A24F 40/42* | (2020.01) |
| *A24F 40/46* | (2020.01) |
| *C04B 35/453* | (2006.01) |
| *C04B 41/00* | (2006.01) |

(52) U.S. Cl.
CPC ............ *C04B 35/453* (2013.01); *A24F 40/10* (2020.01); *A24F 40/42* (2020.01); *A24F 40/46* (2020.01); *C04B 41/0072* (2013.01); *C04B 2235/3298* (2013.01)

(58) Field of Classification Search
CPC .......... A24F 40/48; A24F 40/44; A24F 40/40; A24F 40/10
See application file for complete search history.

(56) References Cited

U.S. PATENT DOCUMENTS

| | | | |
|---|---|---|---|
| 11,992,053 B2 | 5/2024 | Shen et al. | |
| 2009/0039417 A1 | 2/2009 | Chen et al. | |
| 2014/0060554 A1 | 3/2014 | Collett et al. | |
| 2017/0258268 A1 | 9/2017 | Kazanas et al. | |

(Continued)

FOREIGN PATENT DOCUMENTS

| | | |
|---|---|---|
| CN | 1693286 A | 11/2005 |
| CN | 102796406 A | 11/2012 |

(Continued)

OTHER PUBLICATIONS

Chinese Patent Office, Office Action in Chinese Patent Application No. 202210418915.9 (Dec. 14, 2024).

(Continued)

*Primary Examiner* — Alex B Efta

(74) *Attorney, Agent, or Firm* — Leydig, Voit & Mayer, Ltd.

(57) ABSTRACT

A ceramic includes: a ceramic base; and a modification layer arranged on a surface of the ceramic base. The modification layer includes a bismuth-based oxide and other components. In an embodiment, the ceramic base includes a porous ceramic. In an embodiment, the bismuth-based oxide includes bismuth trioxide. In an embodiment, a mass percentage of bismuth in the modification layer is 50% to 80%.

20 Claims, 2 Drawing Sheets

(56) References Cited

U.S. PATENT DOCUMENTS

| | | | |
|---|---|---|---|
| 2018/0066367 A1 | 3/2018 | Galetz et al. | |
| 2019/0098935 A1* | 4/2019 | Phan | C03C 4/02 |
| 2019/0373953 A1* | 12/2019 | Atkins | A24F 40/44 |
| 2022/0039470 A1 | 2/2022 | Courbat et al. | |
| 2022/0408817 A1 | 12/2022 | Lv et al. | |
| 2024/0407450 A1* | 12/2024 | Batista | A24F 40/57 |

FOREIGN PATENT DOCUMENTS

| | | |
|---|---|---|
| CN | 104768407 A | 7/2015 |
| CN | 108088610 A | 5/2018 |
| CN | 109414078 A | 3/2019 |
| CN | 110447959 A | 11/2019 |
| CN | 110922213 A | 3/2020 |
| CN | 111387555 A | 7/2020 |
| CN | 112251723 A | 1/2021 |
| CN | 112369717 A | 2/2021 |
| CN | 112385898 A | 2/2021 |
| CN | 212590295 U | 2/2021 |
| CN | 112552077 A | 3/2021 |
| CN | 112675884 A | 4/2021 |
| CN | 112919932 A | 6/2021 |
| CN | 112931952 A | 6/2021 |
| CN | 113141678 A | 7/2021 |
| CN | 113475755 A | 10/2021 |
| CN | 214509370 U | 10/2021 |
| CN | 113615887 A | 11/2021 |
| CN | 113826962 A | 12/2021 |
| CN | 216059228 U | 3/2022 |
| CN | 216059229 U | 3/2022 |
| CN | 114287676 A | 4/2022 |
| CN | 110922213 B | 11/2022 |
| CN | 217771488 U | 11/2022 |
| CN | 217791478 U | 11/2022 |
| EP | 2499106 | 9/2012 |
| EP | 2892373 | 7/2015 |
| EP | 3332657 A1 | 6/2018 |
| EP | 4005419 A1 | 6/2022 |
| JP | 2015532828 A | 11/2015 |
| JP | 20182994 A | 1/2018 |
| JP | 2019533473 A | 11/2019 |
| JP | 2020147631 A | 9/2020 |
| JP | 2021521862 A | 8/2021 |
| JP | 202261938 A | 4/2022 |
| WO | 2011057730 A1 | 5/2011 |
| WO | 2014037794 A2 | 3/2014 |
| WO | 2021064124 A1 | 4/2021 |
| WO | 2021098408 A1 | 5/2021 |
| WO | 2021143328 A1 | 7/2021 |
| WO | 2021233791 A1 | 11/2021 |
| WO | 2022021036 A1 | 2/2022 |

OTHER PUBLICATIONS

Japanese Patent Office, Decision to Grant a Patent in Japanese Patent Application No. 2023-067871 (Nov. 19, 2024).

Japanese Patent Office, Decision to Grant a Patent in Japanese Patent Application No. 2023-052341 (Dec. 3, 2024).

Japanese Patent Office, Notice of Reasons for Refusal in Japanese Patent Application No. 2023-052341 (Apr. 16, 2024).

Japanese Patent Office, Notice of Reasons for Refusal in Japanese Patent Application No. 2023-067871 (Jun. 18, 2024).

Japanese Patent Office, Decision to Grant a Patent in Japanese Patent Application No. 2023-069321 (Jun. 18, 2024).

European Patent Office, Search Report in European Patent Application No. 23167227.0 (Sep. 20, 2023).

European Patent Office, Search Report in European Patent Application No. 23165768.5 (Aug. 22, 2023).

European Patent Office, Search Report in European Patent Application No. 23165048.2 (Sep. 11, 2023).

Chinese Patent Office, Office Action in Chinese Patent Application No. 202210418914.4 (Jun. 7, 2025).

Chinese Patent Office, Office Action in Chinese Patent Application No. 202210418908.9 (Jun. 20, 2025).

Chinese Patent Office, Rejection Decision in Chinese Patent Application No. 202210418915.9 (Jul. 19, 2025).

U.S. Patent and Trademark Office, Office Action in U.S. Appl. No. 18/191,398 (Jun. 3, 2025).

Japanese Patent Office, Decision of Refusal in Japanese Patent Application No. 2023-052341 (Jul. 23, 2024).

Chinese Patent Office, Office Action in Chinese Patent Application No. 202210418908.9 (Oct. 11, 2025).

Chinese Patent Office, Office Action in Chinese Patent Application No. 202210418914.4 (Oct. 12, 2025).

U.S. Patent and Trademark Office, Office Action in U.S. Appl. No. 18/302,250 (Nov. 17, 2025).

U.S. Patent and Trademark Office, Office Action in U.S. Appl. No. 18/191,398 (Oct. 7, 2025).

Chinese Patent Office, Rejection Decision in Chinese Patent Application No. 202210418914.4 (Jan. 1, 2026).

Chinese Patent Office, Rejection Decision in Chinese Patent Application No. 202210418908.9 (Jan. 12, 2026).

U.S. Patent and Trademark Office, Notice of Allowance in U.S. Appl. No. 18/191,398 (Jan. 13, 2026).

U.S. Patent and Trademark Office, Office Action in U.S. Appl. No. 18/302,250 (May 15, 2026).

* cited by examiner

10

300

CERAMIC, VAPORIZATION CORE, AND VAPORIZER

CROSS-REFERENCE TO PRIOR APPLICATION

Priority is claimed to Chinese Patent Application No. 202210418915.9, filed on Apr. 20, 2022, the entire disclosure of which is hereby incorporated by reference herein.

FIELD

This application relates to the technical field of ceramic materials and the technical field of vaporizers, and in particular, to a ceramic, a vaporization core, and a vaporizer.

BACKGROUND

An electronic vaporization device is generally composed of a vaporizer and a power supply component. The power supply component is configured to supply power to the vaporizer. The vaporizer in an energized state heats and vaporizes an aerosol-forming medium to generate an aerosol for a user to inhale. A vaporization core is one of core components of the electronic vaporization device, and its performance determines the vaporization effect and use experience of the electronic vaporization device.

A commonly used vaporization core is a ceramic base. A heating element is arranged on the ceramic base to realize heating of the aerosol-forming medium. Generally, a modification layer is arranged on the surface of the ceramic base to enhance the bonding force between the heating element and the ceramic base. However, existing modification layers have the problems of narrow firing range and poor thermal shock resistance.

SUMMARY

In an embodiment, the present invention provides a ceramic, comprising: a ceramic base; and a modification layer arranged on a surface of the ceramic base, wherein the modification layer comprises a bismuth-based oxide and other components.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
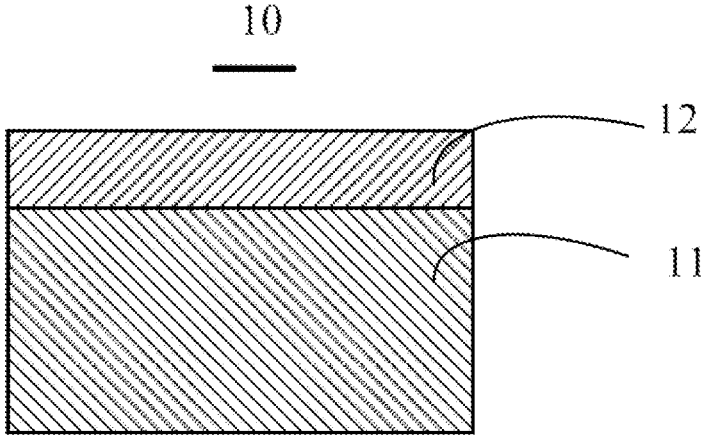
FIG. 1 is a schematic structural diagram of an embodiment of a ceramic according to this application.

In an embodiment, the present invention provides a ceramic, a vaporization core, and a vaporizer to resolve the problems of narrow firing range and poor thermal shock resistance of the modification layer on the ceramic surface in the prior art.

In an embodiment, the present invention provides a ceramic, including a ceramic base and a modification layer, where the modification layer is arranged on the surface of the ceramic base, and the modification layer includes a bismuth-based oxide and other components.

The ceramic base is a porous ceramic.

The bismuth-based oxide includes bismuth trioxide.

The mass percentage of bismuth in the modification layer is 50% to 80%.

The other components include one or more of sodium, magnesium, aluminum, silicon, potassium, calcium, titanium, zinc, zirconium, and barium.

The other components include zinc, and the mass percentage of zinc in the modification layer is 5% to 7%.

The modification layer does not contain lead.

The modification layer is a continuous porous structure.

To resolve the foregoing technical problem, a second technical solution adopted in this application provides a vaporization core, including a ceramic and a heating layer, where the ceramic is any of the ceramic, described above and the heating layer is stacked on the surface of the modification layer away from the ceramic base.

To resolve the foregoing technical problem, a third technical solution adopted in this application provides a vaporizer, including a liquid storage chamber for storing an aerosol-forming medium and the vaporization core described above, and the vaporization core absorbs and heats the aerosol-forming medium in the liquid storage chamber to vaporize the aerosol-forming medium.

This application has the following beneficial effects. Different from the prior art, this application discloses a ceramic, a vaporization core, and a vaporizer. The ceramic includes a ceramic base and a modification layer, where the modification layer is arranged on the surface of the ceramic base, and the modification layer includes a bismuth-based oxide and other components. By arranging the modification layer on the surface of the ceramic base, and optimizing the formulation of the modification layer by adding the bismuth-based oxide in the modification layer, lead-containing oxides in the prior art are replaced with the bismuth-based oxide, and the modification layer containing the bismuth-based oxide has excellent performance. Therefore, the melting temperature of the modification layer is lowered, the firing range of the modification layer is expanded, the thermal expansion coefficient of the modification layer is lowered, and the thermal shock resistance of the modification layer is improved, thereby improving performance of the vaporization core, and further improving performance of the vaporizer.

The technical solutions in embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

The terms "first", "second", and "third" in the embodiments of this application are merely intended for a purpose of description, and shall not be understood as an indication or implication of relative importance or implicit indication of the number of indicated technical features. Therefore, features defined by "first", "second", and "third" can explicitly or implicitly include at least one of the features. In description of this application, unless explicitly specified, "multiple" means at least two, for example, two or three. In addition, the terms "include", "have", and any variant thereof are intended to cover a non-exclusive inclusion. For example, a process, method, system, product, or device that includes a series of steps or units is not limited to the listed steps or units, but further optionally includes a step or unit that is not listed, or further optionally includes another step or unit that is intrinsic to the process, method, product, or device.

"Embodiment" mentioned in the specification means that particular features, structures, or characteristics described with reference to the embodiment may be included in at least one embodiment of this application. The term appearing at different positions of this specification may not refer to the same embodiment or an independent or alternative embodiment that is mutually exclusive with another embodiment. A person skilled in the art explicitly or implicitly understands that the embodiments described in the specification may be combined with other embodiments.

Lead-containing glazes are generally used in existing modification layers on the ceramic surface, and generally have the problems such as narrow firing range and poor thermal shock resistance. Therefore, this application provides a ceramic 10, which is described in detail as follows.

Referring to FIG. 1. FIG. 1 is a schematic structural diagram of an embodiment of a ceramic according to this application.

This application provides a ceramic 10. Referring to FIG. 1, the ceramic 10 includes a ceramic base 11 and a modification layer 12 arranged on the surface of the ceramic base 11. The modification layer 12 includes a bismuth-based oxide and other components. By arranging the modification layer 12 on the surface of the ceramic base 11, and optimizing the formulation of the modification layer 12 by adding the bismuth-based oxide in the modification layer 12, lead-containing oxides in the prior art are replaced with the bismuth-based oxide, and the modification layer 12 containing the bismuth-based oxide has excellent performance. Therefore, the melting temperature and the thermal expansion coefficient of the modification layer 12 are effectively lowered, the firing range of the modification layer 12 is expanded, and the thermal shock resistance and the tensile deformation resistance of the modification layer 12 is improved. It can be understood that the arrangement of the modification layer 12 on the surface of the ceramic base 11 can effectively improve the strength and thermal stability of the ceramic 10 and prevent liquids, gases, etc. from eroding the ceramic base 11, and can also modify the surface of the ceramic base 11 to improve the surface evenness of the ceramic base 11.

Specifically, the bismuth-based oxide in the modification layer 12 is mainly bismuth trioxide. The properties of bismuth trioxide are more stable, and the melting point and boiling point of bismuth trioxide are lower than those of lead oxide. Compared with the existing modification layers having lead-containing oxides added therein, the overall melting temperature of the modification layer 12 can be lowered, the firing range of the modification layer 12 can be expanded, and the sintering temperature of the modification layer 12 can be lowered. In addition, the thermal expansion coefficient of bismuth trioxide is lower than that of lead oxide. Compared with the existing modification layers having lead-containing oxides added therein, the overall thermal expansion coefficient of the modification layer 12 is effectively reduced, and the thermal shock resistance and tensile deformation resistance of the modification layer 12 are improved, so that the modification layer 12 can be better bonded with the ceramic surface, thereby preventing formation of cracks in the modification layer 12 on the ceramic surface.

In the modification layer 12, the mass percentage of bismuth in the modification layer 12 is 50% to 80%. It can be understood that if the content of bismuth in the modification layer 12 is excessively low, property values such as the thermal expansion coefficient and melting temperature of the modification layer 12 cannot be effectively lowered, and the properties such as firing range, thermal shock resistance, and tensile deformation resistance of the modification layer 12 cannot be improved, affecting the performance of the modification layer 12.

The other components in the modification layer 12 include any one or more of sodium, magnesium, aluminum, silicon, potassium, calcium, titanium, zinc, zirconium, and barium.

Optionally, the other components in the modification layer 12 include zinc, and the mass percentage of zinc in the modification layer 12 is 5% to 7%. Zinc exists in the form of oxide in the modification layer 12. Zinc oxide can be used as a fluxing agent in the modification layer 12 to lower the sintering temperature of the modification layer 12. Moreover, zinc oxide can increase the tensile deformation resistance of the modification layer 12, further reduces the overall thermal expansion coefficient of the modification layer 12, and improves the thermal shock resistance, to provide a better thermal matching between the modification layer 12 and the ceramic surface, such that cracking is less likely to occur during subsequent use.

In this embodiment, the composition of the modification layer 12 includes oxygen, sodium, magnesium, aluminum, silicon, potassium, calcium, zinc, bismuth, titanium, zirconium, and barium. Specifically, the mass percentage of oxygen in the modification layer 12 is 21.94 wt %. The mass percentage of sodium in the modification layer 12 is 1.04 wt %. The mass percentage of magnesium in the modification layer 12 is 0.14 wt %. The mass percentage of aluminum in the modification layer 12 is 0.59 wt %. The mass percentage of silicon in the modification layer 12 is 12.79 wt %. The mass percentage of potassium in the modification layer 12 is 1.17 wt %. The mass percentage of calcium in the modification layer 12 is 0.43 wt %. The mass percentage of zinc in the modification layer 12 is 6.185 wt %. The mass percentage of bismuth in the modification layer 12 is 55.715 wt %. Titanium, zirconium, and barium are trace elements in the modification layer 12, are present in low amount in the modification layer 12, and account for less than 0.009% by mass of the modification layer 12.

The ceramic base 11 is a porous structure. Optionally, the ceramic base 11 is directly made of a porous ceramic material. For example, the porous ceramic may be a diatomite porous ceramic, an alumina porous ceramic, a mullite porous ceramic, or a composite porous ceramic composed of at least two of the foregoing materials, or a composite porous ceramic composed of alumina and mullite. Alternatively, the ceramic base 11 of a porous structure may be formed by forming pores in a dense ceramic material, and may be specifically designed according to requirements.

The porosity of the porous ceramic material may be 30% to 70%. Specifically, the porosity may be 30%, 35%, 50%, or 70%. The pore size of the porous ceramic material is 200 nm to 200 μm.

The ceramic base 11 may be of any shape such as a cylinder, a sphere, a cuboid, a cube, or a prism, and may be set to any size, which is not limited herein. In this embodiment, as shown in FIG. 1, the ceramic base 11 is in the shape of a cuboid.

Specifically, the modification layer 12 may be prepared on the surface of the ceramic base 11 by a deposition process such as physical vapor deposition or chemical vapor deposition. For example, the modification layer 12 may be prepared by a technique such as sputtering, evaporation coating, or atomic layer deposition, so that a continuous porous structure or a continuous network structure is formed on the surface of the ceramic base 11 to modify the ceramic base 11. Alternatively, the surface of the ceramic base 11 may be directly coated with a raw material slurry containing the composition of the modification layer 12. Various coating methods such as spraying, brushing, transfer printing, and screen printing may be used, which is not limited herein. After the modification layer 12 is prepared on the surface of the ceramic base 11, the ceramic base 11 and the modification layer 12 are sintered at a sintering temperature of 500° C. to 900° C. A ceramic 10 having good properties can be finally obtained by sintering at this sintering temperature.

The thickness of the modification layer 12 is 50 μm to 300 μm. It can be understood that to form a continuous porous structure of the modification layer 12, the thickness of the modification layer 12 needs to be close to or less than the pore size of the porous ceramic. Preferably, the thickness of the modification layer 12 is 50 μm to 200 μm. The modification layer 12 having such a thickness can form a relatively even surface on the porous ceramic base 11 and can ensure the formation of a continuous porous structure to ensure the liquid guiding ability of the porous ceramic.

In this embodiment, by arranging the modification layer 12 containing bismuth trioxide on the surface of the ceramic base 11, lead, which is toxic, is replaced with bismuth, thereby ensuring the safety of the modification layer 12. In addition, components such as bismuth trioxide and zinc oxide in the modification layer 12 lower the sintering temperature of the modification layer 12, thereby preventing damage to the ceramic base 11 during sintering caused by an excessively high sintering temperature, effectively reduce the thermal expansion coefficient of the modification layer 12, and improve the thermal shock resistance, thereby improving the tensile strength and thermal stability of the ceramic 10, providing a better thermal matching and bonding between the modification layer 12 and the ceramic base 11, and further improving the performance of the ceramic 10.

This application further provides a ceramic preparation method for preparing the ceramic 10. The preparation method specifically includes the following steps.

S1. Obtain a ceramic base.

Specifically, according to specific design requirements, a ceramic base 11 may be directly prepared from a porous ceramic material, or a ceramic base 11 of a porous structure may be prepared by forming pores in a dense ceramic material. In this embodiment, the ceramic base 11 is made of the porous ceramic material, and the ceramic base 11 prepared is in the shape of a cuboid.

S2. Prepare a modification layer on the surface of the ceramic base.

Specifically, a modification layer 12 is prepared by a deposition process or by coating on the surface of the cuboid ceramic base 11 prepared in the foregoing step. Optionally, the modification layer 12 may be prepared on the surface of the ceramic base 11 by a deposition process such as physical vapor deposition or chemical vapor deposition, for example, by a technique such as sputtering, evaporation coating, or atomic layer deposition. Alternatively, the modification layer 12 may be coated on the surface of the ceramic base 11 by various coating methods such as spraying, brushing, transfer printing, and screen printing. The modification layer 12 having a continuous structure is formed on the surface of the ceramic base 11 by the foregoing process. The modification layer 12 prepared on the surface of the ceramic base 11 includes a bismuth-based oxide and other components. The bismuth-based oxide is mainly bismuth trioxide, and the other components include any one or more of sodium, magnesium, aluminum, silicon, potassium, calcium, titanium, zinc, zirconium, and barium, and may be designed according to specific requirements. Raw materials of the modification layer 12 generally include oxides, salts, or simple substances containing the foregoing components and may be selected according to the selected process. When the coating process is selected, a bismuth-based oxide such as bismuth trioxide as well as a salt or an oxide containing at least one of sodium, magnesium, aluminum, silicon, potassium, calcium, titanium, zinc, zirconium, and barium may be selected. For example, the raw materials may be bismuth trioxide, zirconia, zinc oxide, magnesium oxide, calcium oxide, silicon micropowder, barium oxide, sodium carbonate, potassium carbonate, calcium carbonate, sodium silicate, potassium sodium tartrate, etc. Furthermore, the raw materials are mixed to prepare a raw material slurry, and the slurry is then coated on the ceramic base 11.

S3. Sinter the ceramic base and the modification layer.

Specifically, the ceramic base 11 and the modification layer 12 prepared in the foregoing steps are sintered at a sintering temperature of 500° C. to 900° C. After the sintering process, a ceramic 10 having excellent performance is finally obtained, in which the modification layer 12 and the ceramic base 11 are well bonded.

Figure 2:
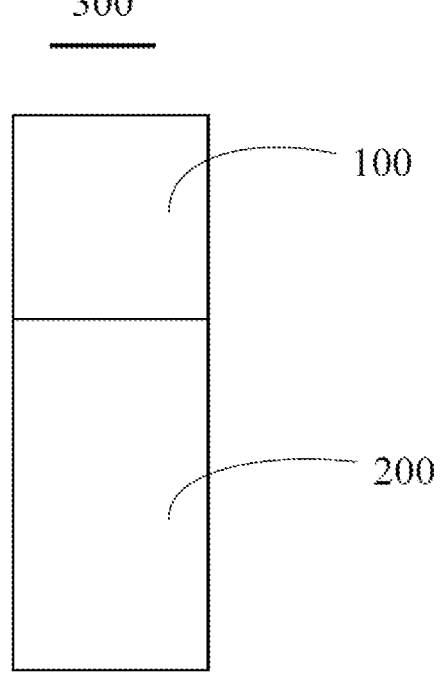
FIG. 2 is a schematic structural diagram of an embodiment of an electronic vaporization device according to this application.
Figure 3:
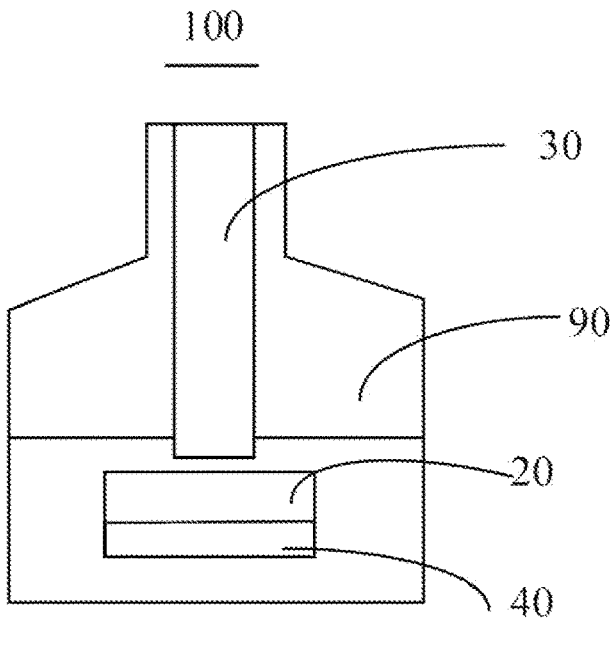
FIG. 3 is a schematic structural diagram of a vaporizer in the electronic vaporization device in FIG. 2.

Referring to FIG. 2 and FIG. 3, FIG. 2 is a schematic structural diagram of an embodiment of an electronic vaporization device according to this application, and FIG. 3 is a schematic structural diagram of a vaporizer in the electronic vaporization device in FIG. 2. Referring to FIG. 2, this application provides an electronic vaporization device 300. The electronic vaporization device 300 includes a vaporizer 100 and a power supply component 200. The power supply component 200 is configured to supply power to the vaporizer 100. The vaporizer 100 in an energized state heats and vaporizes an aerosol-forming medium to generate an aerosol for a user to inhale.

Optionally, the vaporizer 100 and the power supply component 200 in the electronic vaporization device 300 may be integrally formed or may be detachably connected to each other, which may be designed according to specific requirements.

As shown in FIG. 3, the vaporizer 100 includes a liquid storage chamber 90, an air outlet pipe 30, a vaporization core 20, and a vaporization chamber 40 formed in the vaporizer 100. The liquid storage chamber 90 is configured to store an aerosol-forming medium. The vaporization core 20 is configured to absorb the aerosol-forming medium in the liquid storage chamber 90, and heat and vaporize the absorbed aerosol-forming medium to finally generate an aerosol. The aerosol generated by vaporization in the vaporization chamber 40 flows through the air outlet pipe 30 along with an external airflow, and finally flows out of the vaporizer 100 for a user to inhale.

Figure 4:
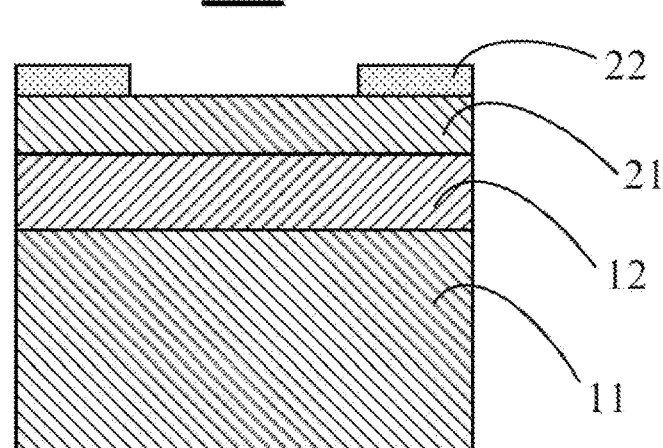
FIG. 4 is a schematic structural diagram of a vaporization core in the vaporizer in FIG. 3.
Figure 5:
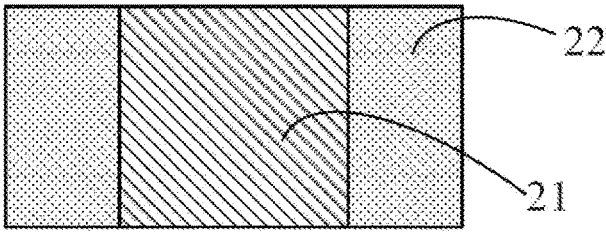
FIG. 5 is a schematic structural top view of the vaporization core in FIG. 4.

Referring to FIG. 4 and FIG. 5, FIG. 4 is a schematic structural diagram of the vaporization core in the vaporizer in FIG. 3, and FIG. 5 is a schematic structural top view of the vaporization core in FIG. 4.

Referring to FIG. 4, the vaporization core 20 includes a ceramic 10 and a heating layer 21. The ceramic 10 is the ceramic 10 provided in this application, and includes a ceramic base 11 and a modification layer 12. The modification layer 12 is arranged on the surface of the ceramic base 11, and the heating layer 21 is stacked on the surface of the modification layer 12 away from the ceramic base 11. It can be understood that the performance of the ceramic vaporization core 20 is often affected by the quality of the ceramic base 11, and the surface of the ceramic base 11 needs to be modified. The modification layer 12 can modify the surface of the ceramic base 11 to form a continuous porous structure on the surface of the ceramic base 11. This facilitates uniform heating and liquid guiding of the vaporization core 20, and also allows the heating layer 21 and the ceramic base 11 to be better bonded via the modification layer 12 to improve heating efficiency of the vaporization core 20, thereby improving vaporization efficiency of the vaporization core 20.

For components and the mass percentages of the components of the modification layer 12 arranged on the surface of the ceramic base 11 in this embodiment, reference may be made to the above description, and the details will not be repeated herein.

To test the thermal shock resistance of the modification layer 12 on the surface of the ceramic base 11 in the vaporization core 20, the inventor of this application has carried out several experiments. Specifically, multiple experiments with different mass percentages of bismuth in the modification layer 12 were carried out to test whether cracks exist in the modification layer 12 on the surface of the ceramic base 11, so as to determine the thermal shock resistance of the modification layer 12.

When the electronic vaporization device 300 is in normal use, the temperature of the vaporization core 20 ranges from 50° C. to 350° C. To test the thermal shock resistance of the modification layer 12 in the vaporization core 20, the inventor of this application has carried out margin tests on the modification layer 12 at a temperature of 400° C. to 800° C.

The inventor of this application has carried out seven experiments in total: Experiment 1, Experiment 2, Experiment 3 . . . , and Experiment 7. The mass percentages of bismuth in the modification layer 12 were different in the seven experiments.

Specifically, in Experiment 1, the mass percentage of bismuth in the modification layer 12 was 50 wt %, and the sintering temperature of the ceramic base 11 having the modification layer 12 arranged on the surface thereof was 500° C. In Experiment 2, the mass percentage of bismuth in the modification layer 12 was 55 wt %, and the sintering temperature of the ceramic base 11 having the modification layer 12 arranged on the surface thereof was 550° C. In Experiment 3, the mass percentage of bismuth in the modification layer 12 was 60 wt %, and the sintering temperature of the ceramic base 11 having the modification layer 12 arranged on the surface thereof was 600° C. In Experiment 4, the mass percentage of bismuth in the modification layer 12 was 65 wt %, and the sintering temperature of the ceramic base 11 having the modification layer 12 arranged on the surface thereof was 600° C. In Experiment 5, the mass percentage of bismuth in the modification layer 12 was 68 wt %, and the sintering temperature of the ceramic base 11 having the modification layer 12 arranged on the surface thereof was 600° C. In Experiment 6, the mass percentage of bismuth in the modification layer 12 was 70 wt %, and the sintering temperature of the ceramic base 11 having the modification layer 12 arranged on the surface thereof was 650° C. In Experiment 7, the mass percentage of bismuth in the modification layer 12 was 80 wt %, and the sintering temperature of the ceramic base 11 having the modification layer 12 arranged on the surface thereof was 700° C.

In the seven experiments, thermal shock tests were carried out on the modification layer 12 at an extreme temperature of 400° C. to 800° C. According to the experimental results obtained by the seven experiments, no cracks were observed in the modification layer 12 on the surface of the ceramic base 11. That is to say, in the seven different experiments, the thermal shock resistance of the modification layer 12 was relatively strong.

After analyzing and studying the experimental results of the experiments the inventor has found that when the mass percentage of bismuth in the modification layer 12 was 50% to 80% and the sintering temperature of the ceramic base 11 having the modification layer 12 arranged on the surface thereof was 500° C. to 900° C., the thermal shock resistance of the modification layer 12 was relatively strong, the thermal matching and bonding between the modification layer 12 and the surface of the ceramic base 11 were better, the thermal expansion coefficient of the modification layer 12 was lower, and the tensile deformation resistance was also stronger. In this case, during the use of the vaporization core 20, cracking is less likely to occur in the modification layer 12, and the heating layer 21 arranged on the surface of the modification layer 12 is prevented from breaking due to cracks in the modification layer 12 to affect vaporization performance and service life of the vaporization core 20, thereby ensuring the usage performance and service life of the vaporization core 20, and improving the vaporization performance of the electronic vaporization device 300.

The ceramic base 11 is a porous structure. Therefore, the modification layer 12 prepared on the surface of the ceramic base 11 by a process such as physical vapor deposition or chemical vapor deposition or coating is also a continuous porous structure or a continuous network structure. Such a structure does not affect the liquid supply effect of the ceramic base 11 to the heating layer 21. In addition, the continuous porous structure or continuous network structure is more conducive to the uniform heating and liquid guiding of the vaporization core 20, such that the aerosol-forming medium stored in the liquid storage chamber 90 can enter the vaporization core 20 more uniformly, and be heated and vaporized by the heating layer 21 in the vaporization core 20 to generate an aerosol, thereby improving the vaporization performance of the vaporization core 20, and further improving the flavor during inhalation by a user.

The shape and size of the ceramic base 11 are not limited. In this embodiment, the ceramic base 11 is made of a porous ceramic material. The porous ceramic has pores and has functions of guiding and storing liquid, so that after being absorbed by the ceramic base 11, the aerosol-forming medium in the liquid storage chamber 90 infiltrates to a vaporizing surface so as to be heated and vaporized. In addition, the porous ceramic has stable chemical properties and does not chemically react with the aerosol-forming medium. Moreover, the porous ceramic is resistant to high temperatures and does not deform due to excessively high heating temperature during vaporization. The porous ceramic is an insulator and cannot be electrically connected to the heating layer 21 to cause a short circuit which leads to failure of the vaporization core 20. The porous ceramic can be easily manufactured at low costs. As shown in FIG. 4, the ceramic base 11 is a cuboid porous ceramic.

In some embodiments, the porosity of the porous ceramic may range from 30% to 70%. Porosity refers to the ratio of the total volume of tiny pores in a porous medium to the total volume of the porous medium. The porosity may be adjusted according to the composition of the aerosol-forming medium. For example, when the viscosity of the aerosol-forming medium is high, a higher porosity is selected to ensure the liquid guiding effect.

In some other embodiments, the porosity of the porous ceramic ranges from 50% to 60%. When the porosity of porous ceramics is 50% to 60%, on the one hand, high liquid guiding efficiency of the porous ceramic can be ensured to prevent the occurrence of dry burning due to poor conveyance of the aerosol-forming medium, thereby improving the vaporization effect of the vaporizer 100. On the other hand, this can also avoid an excessively large porosity of the porous ceramic which leads to unduly fast liquid guiding, difficulty in retaining the liquid, and greatly increased probability of liquid leakage to affect the performance of the vaporizer 100.

The heating layer 21 is arranged on the surface of the modification layer 12 away from the ceramic base 11, is made of metal or alloy, and generates heat when energized so as to heat and vaporize the aerosol-forming medium. Optionally, the heating layer 21 may be at least one of a heating film, a heating coating, a heating circuit, a heating sheet, or a heating network. In this embodiment, the heating layer 21 is a porous heating film structure. It can be understood that the porous structure on the heating layer 21 can allow the liquid aerosol-forming medium to infiltrate to the heating layer 21 more efficiently, thereby improving the liquid guiding and heat conduction efficiency of the heating layer 21, and improving the vaporization efficiency of the vaporization core 20.

The heating layer 21 may be made of a material that can be stably bonded to the modification layer 12. For example, the heating layer 21 may be made of a material such as titanium, zirconium, titanium-aluminum alloy, titanium-zirconium alloy, titanium-molybdenum alloy, titanium-niobium alloy, iron-aluminum alloy, tantalum-aluminum alloy, or stainless steel.

Titanium and zirconium have the following characteristics. Both titanium and zirconium are metals having good biocompatibility. Particularly, titanium is a biophilic metal element, which has higher safety. Titanium and zirconium have relatively large resistivity among metal materials, and can achieve three times the original resistivity at room temperature after being alloyed according to a certain ratio, and therefore are more suitable as materials for the heating layer 21. Titanium and zirconium have low thermal expansion coefficients, can achieve lower thermal expansion coefficients after being alloyed, and have better thermal matching with the modification layer 12. After being alloyed according to a certain ratio, the alloy has a lower melting point and better film-forming property in magnetron sputtering coating. Through electron microscope analysis, it can be seen that microscopic particles of metals after coating are spherical, and the particles together form a cauliflower-like microscopic morphology. It can be seen through electron microscope analysis that microscopic particles of a film formed by titanium-zirconium alloy are in the form of flakes, and some grain boundaries between particles disappear, exhibiting better continuity. Both titanium and zirconium have good plasticity and elongation. A titanium-zirconium alloy film has better thermal cycling resistance and current impact resistance. Based on the foregoing characteristics of titanium and zirconium, in this embodiment, the heating layer 21 is made of titanium-zirconium alloy.

Optionally, the heating layer 21 may be prepared on the surface of the modification layer 12 away from the ceramic base 11 by a process such as physical vapor deposition or chemical vapor deposition. For example, the heating layer 21 may be prepared by a technique such as sputtering, evaporation coating, or atomic layer deposition.

In this embodiment, the titanium-zirconium alloy film made of titanium-zirconium alloy is a partially dense film. However, because the modification layer 12 is a porous structure, the titanium-zirconium alloy film formed on the surface of the modification layer 12 also becomes a continuous porous structure, and the pore size distribution of the titanium-zirconium alloy film is slightly smaller than that of micropores in the surface of the modification layer 12.

Referring to FIG. 4, in this embodiment, the vaporization core 20 further includes two electrodes 22. The two electrodes 22 are respectively electrically connected to the power supply component 200 in the electronic vaporization device 300 to supply power to the heating layer 21 of the vaporization core 20, so that the heating layer 21 generates heat when energized, so as to heat and vaporize the aerosol-forming medium absorbed in the ceramic base 11 to generate an aerosol. Specifically, as shown in FIG. 4 and FIG. 5, the two electrodes 22 are both arranged on the surface of the heating layer 21 away from the ceramic base 11, and the two electrodes 22 are spaced apart to facilitate the electrical connection between the power supply component 200 and the electrodes 22, so as to supply power to the vaporization core 20.

Different from the prior art, this application discloses a ceramic, a vaporization core, and a vaporizer. The ceramic includes a ceramic base and a modification layer, where the modification layer is arranged on the surface of the ceramic base, and the modification layer includes a bismuth-based oxide and other components. By arranging the modification layer on the surface of the ceramic base, and optimizing the formulation of the modification layer by adding the bismuth-based oxide in the modification layer, lead-containing oxides in the prior art are replaced with the bismuth-based oxide, and the modification layer containing the bismuth-based oxide has excellent performance. Therefore, the melting temperature of the modification layer is lowered, the firing range of the modification layer is expanded, the thermal expansion coefficient of the modification layer is lowered, and the thermal shock resistance and the tensile deformation resistance of the modification layer are improved, thereby improving performance of the vaporization core, and further improving performance of the electronic vaporization device.

The foregoing descriptions are merely embodiments of this application, and the patent scope of this application is not limited thereto. All equivalent structure or process changes made according to the content of this specification and accompanying drawings in this application or by directly or indirectly applying this application in other related technical fields shall fall within the protection scope of this application.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A ceramic, comprising:
a ceramic base; and
a modification layer arranged on a surface of the ceramic base,
wherein the modification layer comprises a bismuth-based oxide.

2. The ceramic of claim 1, wherein the ceramic base comprises a porous ceramic.

3. The ceramic of claim 2, wherein the bismuth-based oxide comprises bismuth trioxide.

4. The ceramic of claim 2, wherein a mass percentage of bismuth in the modification layer is 50% to 80%.

5. The ceramic of claim 2, wherein the modification layer further comprises at least one of sodium, magnesium, aluminum, silicon, potassium, calcium, titanium, zinc, zirconium, and barium.

6. The ceramic of claim 5, wherein the modification layer comprises zinc, and
wherein a mass percentage of zinc in the modification layer is 5% to 7%.

7. The ceramic of claim 2, wherein the modification layer does not contain lead.

8. The ceramic of claim 2, wherein the modification layer comprises a continuous porous structure.

9. A vaporization core, comprising:
the ceramic of claim 2; and
a heating layer stacked on a surface of the modification layer away from the ceramic base.

10. A vaporizer, comprising:
a liquid storage chamber configured to store an aerosol-forming medium; and
the vaporization core of claim 9,
wherein the vaporization core is configured to absorb and heat the aerosol-forming medium in the liquid storage chamber to vaporize the aerosol-forming medium.

11. The ceramic of claim 5, wherein titanium, zirconium, and barium are applied as trace elements and account for less than 0.009% by mass of the modification layer.

12. The ceramic of claim 2, wherein a porosity of the porous ceramic is 30% to 70%.

13. The ceramic of claim 2, wherein a pore size of the porous ceramic is 200 nm to 200 μm.

14. The ceramic of claim 13, wherein a thickness of the modification layer is equal to or less than the pore size of the porous ceramic so as to form a continuous porous structure.

15. The ceramic of claim 1, wherein a thickness of the modification layer is 50 μm to 200 μm.

16. The ceramic of claim 1, wherein the modification layer further comprises zinc oxide so as to lower a sintering temperature of the modification layer.

17. The vaporization core of claim 9, wherein the heating layer comprises metal or alloy, the heating layer being configured to generate heat when energized so as to heat an aerosol-forming medium.

18. The vaporization core of claim 17, wherein the heating layer comprises a titanium-zirconium alloy film, and
wherein a pore size of pores in the titanium-zirconium alloy film is less than a pore size of pores in the surface of the modification layer.

19. The vaporization core of claim 9, wherein the heating layer comprises a porous heating film structure.

20. A ceramic comprising:
a ceramic base; and
a modification layer arranged on a surface of the ceramic base, the modification layer comprising a bismuth-based oxide, and at least one of sodium, magnesium, aluminum, silicon, potassium, calcium, titanium, zinc, zirconium, and barium,
wherein a mass percentage range of bismuth in the modification layer is 50% to 80%.

* * * * *